2,729,651
Patented Jan. 3, 1956

2,729,651

PROCESS FOR THE PRODUCTION OF ALIPHATIC OXYGEN COMPOUNDS BY CARBONYLATION OF ALCOHOLS, ETHERS, AND ESTERS

Walter Reppe, Ludwigshafen (Rhine), Herbert Friederich, Worms, Nikolaus von Kutepow, Karlsruhe-Rueppurr, and Walter Morsch, Ludwigshafen (Rhine), Germany, assignors to Badische Anilin- & Soda-Fabrik Aktiengesellschaft, Ludwigshafen (Rhine), Germany No Drawing. Application June 9, 1953, Serial No. 360,616

Claims priority, application Germany June 11, 1952

24 Claims. (Cl. 260—343.5)

This invention relates to the production of aliphatic oxygen compounds, in particular carboxylic acids, their esters and anhydrides, by the interaction of alcohols, ethers or esters with carbon monoxide in the presence of novel carbonylation catalysts. More particularly, our invention relates to heating a lower aliphatic saturated alcohol, an ether or an ester thereof with carbon monoxide or a mixture thereof with hydrogen under superatmospheric pressure in the liquid phase in the presence of novel carbonylation catalysts. In still more specific terms our invention is directed to the synthesis of low molecular saturated aliphatic carboxylic acids, their esters and anhydrides by treating lower aliphatic saturated alcohols with carbon monoxide-containing gases under superatmospheric pressure at elevated temperatures in the presence of complex nickel halides.

It has been known that alcohols, in particular methanol, or their ethers may be carbonylated to form aliphatic oxygen compounds containing more carbon atoms than the starting material. In these carbonylations either carbon monoxide or mixtures thereof with hydrogen have been used, the reaction conditions as to temperatures and pressures have been varied to a large extent and a number of catalysts have been proposed.

It is generally accepted today that carbonyl-forming metals or their compounds are the most active catalysts for such carbonylations. They are far superior to other catalysts both in rate of conversion and yields of the desired materials. Nevertheless, the known carbonylation catalysts of this type have some drawbacks. They are converted into metal carbonyls in the course of the reaction and dissolved as such in the reaction product. This makes it necessary to regenerate the carbonyl-forming metal as a matter of purification and economy.

It is an object of our invention to provide for the carbonylation of alcohols their ethers or esters with carbon monoxide catalysts which give satisfactory rates of conversion and yields and are free from the drawback mentioned above.

According to our invention the reaction of methanol and other saturated lower aliphatic alcohols, their ethers and esters is carried out in the presence of complex nickel halides which contain in the molecule in addition to the nickel halide also an organic onium halide, e. g. an ammonium or phosphonium halide.

Suitable catalysts of this type are in particular the quaternary ammonium nickel bromides, corresponding bromides-iodides or the iodides. These compounds correspond to the general formula:

[A$_4$N]$_2$·Ni·X$_4$ wherein A stands for a lower molecular alkyl radicle, in particular a saturated hydrocarbon radicle containing from 1 to 4 carbon atoms, or two of the A form an alkylene radicle containing from 5 to 7 carbon atoms, and X stands for a halide ion, in particular bromide or iodide ion. It is self-understood that in the tetra-alkyl ammonium radicle as defined above several of the alkyl groups may be replaced by aralkyl or cycloalkyl radicles, or that another quaternary ammonium compound may be used, such as benzyl or alkyl pyridinium radicles. To cite a few examples of such compounds we name e. g.:

Tetramethyl ammonium nickel iodide

[(CH$_3$)$_4$N]$_2$·NiI$_4$

Triethyl butyl ammonium nickel bromide iodide

[(C$_2$H$_5$)$_3$(C$_4$H$_9$)N]$_2$·NiBr$_2$I$_2$

Diethyl dibutyl ammonium nickel iodide

[(C$_2$H$_5$)$_2$(C$_4$H$_9$)$_2$N]$_2$·NiI$_4$

Tetra propyl ammonium nickel bromide iodide

[(C$_3$H$_7$)$_4$N]$_2$·NiBr$_2$I$_2$

Trimethyl cyclohexyl ammonium nickel bromide

[(CH$_3$)$_3$(C$_6$H$_{11}$)N]$_2$·NiBr$_4$

Butyl pyridinium nickel bromide

[(C$_5$H$_5$N)(C$_4$H$_9$)]$^2$·NiBr$_4$

Benzyl pyridinium nickel iodide

[(C$_5$H$_5$N)(C$_6$H$_5$CH$_2$)]$_2$·NiI$_4$

Diethyl pyrrolidinium nickel iodide

[(C$_2$H$_5$)$_2$NH]$_2$·NiI$_4$ and analogous compounds.

Instead of the ammonium compounds, we may as well use the corresponding phosphonium compounds, in particular the triaryl alkyl phosphonium nickel bromides, wherein the alkyl contains between 1 and 6 carbon atoms and the aryl is a mononuclear hydrocarbon radicle of the benzene series, e. g. either phenyl or a homologue thereof, such as tolyl or xylyl. In all these cases, the catalysts may also be formed in situ, e. g. by adding to the starting material a nickel halide or nickel and free halogen and a quaternary ammonium or phosphonium halide.

We may also use mixtures of quaternary ammonium and phosphonium halides in building up the catalysts.

These catalysts have various advantages over those conventionally used in such carbonylations. Generally speaking, it is possible to obtain the same yields and conversions at relatively low temperatures as compared with the known catalysts. Due to the specific constitution of the novel catalysts very little nickel carbonyl is formed so that the catalysts can be used repeatedly for a long time while at the same time the reaction products can be isolated free from soluble nickel compounds in a very simple manner. Another advantage resides in the fact that the course of the reaction is so directed as to form very small amounts of higher boiling by-products.

We prefer to carry out the reaction at temperatures between 70° to 250° C. Higher temperatures, e. g. up to 300° C., may also be used but ether formation is more pronounced under these conditions. We use superatmospheric pressure, preferably pressures above 50 atmospheres and most preferably in the range between 200 and 700 atmospheres. There is no principal obstacle against using higher pressures, such as 800 atmospheres.

The carbon monoxide used may be pure; it may also contain other gases, such as nitrogen, methane, carbon dioxide and/or hydrogen. When working with a mixture of carbon monoxide with other gases, it is recommended to keep the minimum concentration of carbon monoxide at 10 per cent. The ratio between carbon monoxide and hydrogen, if this is present, has some influence on the nature of the reaction product. When working with an excess of carbon monoxide over hydrogen, e. g. with at least 60 parts by volume of CO and at most 40 parts of H₂, the main products are carboxylic acids, their esters or anhydrides. When using higher hydrogen concentrations in the carbonylation of alcohols the reaction product tends to contain more aldehydic substances. The carbon monoxide or the carbon monoxide-hydrogen mixture, respectively, should be substantially free from hydrogen sulfide.

The reaction may be carried out discontinuously, e. g. in pressure-tight vessels. When starting from an alcohol they should be made from stainless steel or lined with corrosion-resistant material. We may also work continuously. In all cases there is no necessity to carry on the action of carbon monoxide on the starting material until all of the latter has been converted. We sometimes prefer to carry on the reaction until only part of the starting material has been converted, separate the unchanged material from the reaction product and lead it back to the reaction. The preferred method of working up the reaction mixture is distillation, eventually under superatmospheric pressure or under reduced pressure. The conventional distillation techniques may be used, such as using azeotropic distillation or distilling in the presence of steam. The catalyst used will be found in most cases substantially unchanged in the distillation residue. As a rule, it may be used again without further purification.

While the amount of catalyst used is not an essential feature of our process, we prefer to use a concentration of between 0.01 to 2 per cent of nickel in the complex form calculated on the starting material. Since the starting material is usually used in excess, the use of an additional solvent may be avoided. In principle such solvents, e. g. hydrocarbons, esters, ethers, N-alkyl lactams, or the reaction products, may be employed.

The reaction runs most smoothly when starting with methanol. However, it may be also applied with satisfactory results to mono- and bivalent alcohols of 2 to 4 carbon atoms, such as ethanol, the propanols and butanols, ethylene glycol, propylene glycol and the butanediols. We may also use mixtures of saturated aliphatic alcohols, as they are obtained in the hydration of olefin mixtures. Ethers, as a rule, react less readily than alcohols. However, the novel catalysts offer a distinct advantage in this reaction as compared with the catalyst hitherto used. Typical examples of ethers are the dialkyl ethers, containing saturated hydrocarbon radicals of from 1 to 4 carbon atoms, such as dimethyl ether, dipropyl ethers, and the corresponding mixed ethers.

Instead of the alcohols and their ethers we may also use as starting materials the esters of such alcohols with saturated low molecular carboxylic acids containing up to 4 carbon atoms, in particular the acetates and propionates.

The following examples will further illustrate how this invention may be carried out in practice. The invention, however, is not restricted to these examples. The parts are by weight.

Example 1

A high pressure autoclave is charged with a mixture of 150 parts of methyl acetate and 30 parts of triphenyl butyl phosphonium nickel tetrabromide which is dissolved in 150 parts of N-methyl pyrrolidone. This mixture is treated at 190° C. with carbon monoxide under 700 atmospheres for 10 hours. The green reaction mixture is subjected to fractional distillation. Besides N-methyl pyrrolidone and unchanged methyl acetate 90 parts of acetic acid anhydride are obtained which corresponds to 43 per cent conversion at an almost quantitative yield, calculated on the methyl acetate converted. The distillation residue consists of unchanged green catalyst which may be used again without any further treatment.

Under otherwise identical conditions, the following yields of anhydride were obtained with an equal amount of other catalysts:

| | Parts |
|---|---|
| Triphenyl ethyl phosphonium nickel tetra iodide | 106 |
| Tritolyl butyl phosphonium nickel tetra bromide | 92 |
| Tritolyl butyl phosphonium nickel tetra iodide | 100 |

When reducing the pressure to 400 atmospheres, about the same yields could be obtained after a reaction time of 24 hours.

Example 2

A high pressure autoclave is charged with a mixture of 100 parts of dimethyl ether, 30 parts of triphenyl n-propyl phosphonium nickel tetrabromide, dissolved in 150 parts of N-methyl pyrrolidone. The mixture is treated at 190° C. with carbon monoxide under 700 atmospheres for 5 hours. Distillation of the reaction mixture gives, besides unchanged N-methyl pyrrolidone and dimethyl ether, 20 parts of acetic acid anhydride, 5 parts of methyl acetate and no by-products. The conversion rate was 12 per cent.

The rate may be increased by prolonging the treatment to 10 hours; the ratio of anhydride to acetate is not substantially changed.

When using under otherwise identical conditions tritolyl butyl phosphonium bromide, the yields are 23 parts and 4 parts, respectively, with the corresponding iodides the yields are slightly higher (25 and 6 parts).

Example 3

A high pressure autoclave is charged with 150 parts of methyl acetate and 36 parts of tetramethyl ammonium nickel iodide, dissolved in 150 parts of N-methyl pyrrolidone. The mixture is treated at 190° C. with carbon monoxide under 700 atmospheres for 18 hours. Distillation of the reaction mixture yields, besides N-methyl pyrrolidone and unchanged methyl acetate, 187 parts of acetic acid anhydride, corresponding to a 90 per cent conversion. The distillation residue consists of 2 parts of higher boiling products and the unchanged catalyst.

The following table shows the results of various other examples, all starting from 150 parts of methyl acetate and using an equal amount of catalyst (35 parts) as well as 150 parts of N-methyl pyrrolidone:

| No. | Catalyst | Temp. | Press. | Time, hrs. | Yield of anhydride (parts) |
|---|---|---|---|---|---|
| 4 | [(C₂H₅)₄N]₂.NiI₄ | 190 | 700 | 19 | 163 |
| 5 | [(C₂H₅)₄N]₂.NiBr₂I₂ | 190 | 700 | 24 | 168 |
| 6 | [(C₂H₅)₄N]₂.NiBr₄ | 190 | 700 | 26 | 131 |
| 7 | [(CH₃)₃(C₄H₉)N]₂.NiI₄ | 190 | 700 | 18 | 174 |
| 8 | [(CH₃)₃(C₄H₉)N]₂.NiI₄ | 180 | 700 | 24 | 158 |
| 9 | [(CH₃)₃(C₄H₉)N]₂.NiI₄ | 190 | 500 | 24 | 130 |
| 10 | [(CH₃)₄N]₂.NiI₄ + [(C₆H₅)₃(C₄H₉)P]₂.NiBr₄] | 190 | 700 | 24 | 180 |

Example 11

An autoclave made from stainless steel is charged with 200 parts of methanol and 34 parts of triphenyl ethyl phosphonium tetraiodide. The mixture is treated at 200° C. with carbon monoxide under 700 atmospheres for 42 hours. Distillation of the greenish reaction liquid yields 35 parts of methyl acetate (15 per cent conversion), 312 parts of acetic acid (83 per cent conversion) and some water formed in the esterification.

The following table shows the results of a number of runs carried out with various catalysts under otherwise identical conditions:

| | Catalyst | Acet acid (parts) | Methyl acetate (parts) |
|---|---|---|---|
| a | [(C₆H₅)₃(C₄H₉)P]₂·NiBr₂I₂ | 260 | 23 |
| b | [(C₆H₄CH₃)₃(C₂H₅)P]₂·NiI₄ | 296 | 18 |
| c | [(C₆H₅)₃(C₄H₉)P]₂·NiBr₄ | 188 | 45 |
| d | [(C₂H₅)₄N]₂·NiI₄ | 217 | 83 |
| e | [(CH₃)₃(C₃H₇)N]₂·NiBr₂I₂ | 183 | 47 |
| | [(CH₃)₃(C₄H₉)N]₂·NiI₄ | 253 | 38 |

*Example 12*

A mixture of 150 parts of methyl acetate, 20 parts of tetramethyl ammonium iodide and 10 parts of nickel iodide, dissolved in 150 parts of N-methyl pyrrolidone, is treated at 190° C. with a mixture of carbon monoxide and hydrogen (CO:H₂=95:5) under 325 atmospheres for 10 hours. Distillation of the reaction liquid yields, besides N-methyl pyrrolidone and unchanged methyl acetate, 56 parts of acetic acid anhydride, corresponding to a 27 per cent conversion.

*Example 13*

A solution of 20 parts of tetramethyl ammonium nickel iodide in 200 parts of butanediol-1.4 is treated with carbon monoxide under 700 atmospheres for 32 hours. The reaction mixture, after being allowed to cool, contains 125 parts of crystalline adipic acid, colored slightly green. This is filtered off and the 155 parts of filtrate thus obtained contain more adipic acid and δ-valerolactone and valeric acid, besides the unchanged catalyst.

*Example 14*

A stainless steel autoclave is charged with 125 parts of butanediol-1.4, 8 parts of powdered nickel, 2 parts of iodine, 0.2 part of bismuth, 1 part of triethyl amine and 2.5 parts of ethyl iodide. Carbon monoxide under 60 atmospheres is pressed in, the autoclave heated to 250° C. and the carbon monoxide pressure increased to 200 atmospheres. This pressure is maintained by replenishing the carbon monoxide consumed. After 16 hours, the reaction product is allowed to cool and the free adipic acid deposited filtered off and washed with benzene. The yield is 108 parts (54 per cent yield).

The filtrate has a composition similar to that of Example 13.

When starting the reaction with a mixture of CO and H₂ in the ratio 70:30 and replenishing fresh CO, the reaction time is 24 hours and the yield of adipic acid 98 parts.

We claim:

1. In the production of aliphatic oxygen compounds by the action of carbon monoxide on oxygen compounds selected from the group consisting of saturated lower molecular aliphatic alcohols, their ethers and their aliphatic monocarboxylic acid esters at elevated temperatures and under superatmospheric pressure in the presence of nickel compounds, the step which comprises using as the catalyst a complex compound of a nickel halide with an organic halide selected from the group consisting of tertiary and quaternary ammonium and phosphonium halides.

2. In the process as set forth in claim 1, wherein carbon monoxide is used in admixture with hydrogen.

3. A process for the production of aliphatic oxygen compounds which comprises treating an oxygen compound selected from the group consisting of saturated lower molecular aliphatic alcohols, their ethers and their aliphatic monocarboxylic acid esters at temperatures between 70° and 250° C. and under pressures from about 200 to 800 atmospheres with carbon monoxide in the presence of a complex compound of a nickel halide with an organic halide selected from the group consisting of tertiary and quaternary ammonium and phosphonium halides as the catalyst.

4. A process set forth in claim 3, wherein at least part of the halide radicles in the complex nickel halide used as the catalyst are iodide radicles.

5. A process as set forth in claim 3, wherein the oxygen compound treated is a primary aliphatic alcohol having not more than 4 carbon atoms.

6. A process as set forth in claim 3, wherein the carbon monoxide is admixed with hydrogen in an amount not exceeding 40 parts by volume thereof for 60 parts by volume of carbon monoxide.

7. A process for the production of aliphatic oxygen compounds which comprises treating methanol at temperatures between 70° and 250° C. and under pressures from about 200 to 800 atmospheres with carbon monoxide in the presence of a complex compound of a nickel halide with an organic halide selected from the group consisting of tertiary and quaternary ammonium and phosphonium halides as the catalyst.

8. A process as set forth in claim 7, wherein at least part of the halide radicles in the complex nickel halide used as the catalyst are iodide radicles.

9. A process for the production of aliphatic oxygen compounds which comprises treating methanol at temperatures between 70° and 250° C. and under pressures from about 200 to 800 atmospheres with mixtures of carbon monoxide and hydrogen containing at most 40 per cent by volume of hydrogen in the presence of a complex compound of a nickel halide with an organic halide selected from the group consisting of tertiary and quaternary ammonium and phosphonium halides as the catalyst, wherein at least part of the halide radicles in the complex nickel halide used as the catalyst are iodide radicles.

10. A process as set forth in claim 9, wherein the catalyst contains a quaternary ammonium radicle.

11. A process as set forth in claim 9, wherein the catalyst contains a quaternary phosphonium radicle.

12. A process for the production of aliphatic oxygen compounds which comprises treating dimethyl ether at temperatures between 70° and 250° C. and under pressures from about 200 to 800 atmospheres with carbon monoxide in the presence of a complex compound of a nickel halide with an organic halide selected from the group consisting of tertiary and quaternary ammonium and phosphonium halides as the catalyst.

13. A process as set forth in claim 12, wherein at least part of the halide radicles in the complex nickel halide used as the catalyst are iodide radicles.

14. A process for the production of aliphatic oxygen compounds which comprises treating dimethyl ether at temperatures between 70° and 250° C. and under pressures from about 200 to 800 atmospheres with mixtures of carbon monoxide and hydrogen containing at most 40 per cent by volume of hydrogen in the presence of a complex compound of a nickel halide with an organic halide selected from the group consisting of a tertiary and quaternary ammonium and phosphonium halides as the catalyst, wherein at least part of the halide radicles in the complex nickel halide used as the catalyst are iodide radicles.

15. A process as set forth in claim 14, wherein the catalyst contains a quaternary ammonium radicle.

16. A process as set forth in claim 14, wherein the catalyst contains a quaternary phosphonium radicle.

17. A process for the production of aliphatic oxygen compounds which comprises treating butane diol-1.4 at temperatures between 70° and 250° C. and under pressures from about 200 to 800 atmospheres with carbon monoxide in the presence of a complex compound of a nickel halide with an organic halide selected from the group consisting of tertiary and quaternary ammonium and phosphonium halides as the catalyst.

18. A process as set forth in claim 17, wherein at least part of the halide radicles in the complex nickel halide used as the catalyst are iodide radicles.

19. A process for the production of aliphatic oxygen compounds which comprises treating butane diol-1.4 at temperatures between 70° and 250° C. and under pressures from about 200 to 800 atmospheres with mixtures of carbon monoxide and hydrogen containing at most 40 per cent by volume of hydrogen in the presence of a complex compound of a nickel halide with an organic halide selected from the group consisting of tertiary and quaternary ammonium and phosphonium halides as the catalyst, wherein at least part of the halide radicles in the complex nickel halide used as the catalyst are iodide radicles.

20. A process as set forth in claim 19, wherein the catalyst contains a quaternary ammonium radicle.

21. A process as set forth in claim 19, wherein the catalyst contains a quaternary phosphonium radicle.

22. A process for the production of aliphatic oxygen compounds which comprises treating methyl acetate at temperatures between 70° and 250° C. and under pressures from about 200 to 800 atmospheres with mixtures of carbon monoxide and hydrogen containing at most 40 per cent by volume of hydrogen in the presence of a complex compound of a nickel halide with an organic halide selected from the group consisting of tertiary and quaternary ammonium and phosphonium halides as the catalyst, wherein at least part of the halide radicles in the complex nickel halide used as the catalyst are iodide radicles.

23. A process as set forth in claim 22, wherein the catalyst contains a quaternary ammonium radicle.

24. A process as set forth in claim 22, wherein the catalyst contains a quaternary phosphonium radicle.

References Cited in the file of this patent

UNITED STATES PATENTS

| | | |
|---|---|---|
| 1,784,583 | Dreyfus | Dec. 9, 1930 |
| 1,927,414 | Oxley | Sept. 19, 1933 |
| 1,946,255 | Carpenter | Feb. 6, 1934 |
| 1,946,256 | Woodhouse | Feb. 6, 1934 |
| 2,010,402 | Larson et al. | Aug. 6, 1935 |
| 2,039,722 | Larson | May 5, 1936 |
| 2,308,594 | Dreyfus | Jan. 19, 1943 |
| 2,650,245 | Thomas | Aug. 25, 1953 |

FOREIGN PATENTS

| | | |
|---|---|---|
| 338,854 | Great Britain | Nov. 24, 1930 |
| 490,544 | Great Britain | Aug. 17, 1938 |